US009697562B2

(12) United States Patent
De Assuncao et al.

(10) Patent No.: US 9,697,562 B2
(45) Date of Patent: Jul. 4, 2017

(54) RESOURCE PROVISIONING FOR ELECTRONIC BOOKS

(71) Applicant: INTERNATIONAL BUSINESS MACHINES CORPORATION, Armonk, NY (US)

(72) Inventors: Marcos Dias De Assuncao, Sao Paulo (BR); Silvia Cristina Sardela Bianchi, Sao Paulo (BR); Marco Aurelio Stelmar Netto, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 261 days.

(21) Appl. No.: 13/912,970

(22) Filed: Jun. 7, 2013

(65) Prior Publication Data
US 2014/0365875 A1   Dec. 11, 2014

(51) Int. Cl.
*G06F 17/21* (2006.01)
*G06Q 30/06* (2012.01)
(Continued)

(52) U.S. Cl.
CPC ......... *G06Q 30/0641* (2013.01); *G06F 3/013* (2013.01); *G06F 17/212* (2013.01);
(Continued)

(58) Field of Classification Search
CPC .... G06F 1/163; G06F 15/0291; G06F 17/217; G06F 17/2229; G06F 17/30011;
(Continued)

(56) References Cited

U.S. PATENT DOCUMENTS 6,067,565 A * 5/2000 Horvitz .................. 709/218
6,281,986 B1 * 8/2001 Form ............... G06F 17/30274
345/522
(Continued)

FOREIGN PATENT DOCUMENTS

CN    102193921    9/2011
CN    102622332    8/2012
(Continued)

OTHER PUBLICATIONS

Wei Shen, et al., Ebooks in the Cloud: Desirable Features and Current Challenges for a Cloud-Based Academic Ebook Infrastructure, 15th International Conference on Electronic Publishing, 2011.
(Continued)

*Primary Examiner* — Wilson Tsui
(74) *Attorney, Agent, or Firm* — F. Chau & Associates, LLC

(57) ABSTRACT

A method for provisioning IT resources includes receiving a signal from an e-book reading device indicating that a user of the e-book reading device is approaching a practical procedure section within an e-book being read by the user on the e-book reading device. The practical procedure section includes an exercise to be performed by the user pertaining to the subject matter of the e-book. What IT resources are needed for the user to perform the exercise are determined. The needed IT resources are provisioned such that the IT resources that the needed IT resources are available when the user is ready to perform the exercise.

5 Claims, 6 Drawing Sheets

(51) Int. Cl.
*G06F 3/01* (2006.01)
*G09B 7/00* (2006.01)
*G09B 7/02* (2006.01)

(52) U.S. Cl.
CPC ....... *G06F 17/217* (2013.01); *G06Q 30/0601* (2013.01); *G09B 7/00* (2013.01); *G09B 7/02* (2013.01); *G09G 2380/14* (2013.01)

(58) Field of Classification Search
CPC ............ G06F 17/30861; G06F 17/212; G06Q 30/0641; G06Q 30/0601
See application file for complete search history.

(56) References Cited

U.S. PATENT DOCUMENTS

| | | | |
|---|---|---|---|
| 6,311,040 | B1* | 10/2001 | Kucinski et al. ............. 434/350 |
| 6,941,105 | B1* | 9/2005 | Rowley et al. ............. 434/350 |
| 7,136,819 | B2 | 11/2006 | Whitham |
| D605,194 | S | 12/2009 | Hakoda |
| D623,184 | S | 9/2010 | Green et al. |
| D631,474 | S | 1/2011 | Green et al. |
| D632,687 | S | 2/2011 | Seong |
| D632,688 | S | 2/2011 | Seong |
| 8,028,893 | B1 | 10/2011 | Narasimhan et al. |
| 8,046,435 | B1* | 10/2011 | Parekh et al. ................ 709/219 |
| 8,260,915 | B1 | 9/2012 | Ashear |
| 8,290,777 | B1 | 10/2012 | Nguyen et al. |
| 8,316,032 | B1 | 11/2012 | Baluja et al. |
| 8,397,163 | B1 | 3/2013 | Sran |
| 8,713,418 | B2* | 4/2014 | King et al. .................... 715/200 |
| 8,832,584 | B1* | 9/2014 | Agarwal et al. ............. 715/776 |
| 8,892,638 | B2* | 11/2014 | Chang ...................... G06F 9/54 709/203 |
| 2003/0182358 | A1* | 9/2003 | Rowley .................... G09B 5/12 709/203 |
| 2004/0205651 | A1* | 10/2004 | Dutta et al. ................... 715/530 |
| 2008/0243991 | A1 | 10/2008 | Ryan et al. |
| 2012/0019526 | A1* | 1/2012 | Jung et al. ..................... 345/419 |
| 2012/0075168 | A1* | 3/2012 | Osterhout et al. ................ 345/8 |
| 2012/0131491 | A1 | 5/2012 | Lee |
| 2012/0204086 | A1* | 8/2012 | Stoner .................. G06F 17/214 715/201 |
| 2012/0218305 | A1 | 8/2012 | Patterson et al. |
| 2012/0221441 | A1 | 8/2012 | Patterson et al. |
| 2012/0221938 | A1 | 8/2012 | Patterson et al. |
| 2012/0221968 | A1 | 8/2012 | Patterson et al. |
| 2012/0233242 | A1 | 9/2012 | Murray et al. |
| 2012/0240036 | A1 | 9/2012 | Howard et al. |
| 2012/0289156 | A1 | 11/2012 | Boudville |
| 2013/0104028 | A1* | 4/2013 | Murray et al. ................ 715/234 |
| 2013/0304798 | A1* | 11/2013 | Chang et al. ................. 709/203 |
| 2013/0321390 | A1* | 12/2013 | Latta et al. ................... 345/419 |
| 2014/0007257 | A1 | 1/2014 | Dougherty et al. |
| 2014/0365875 | A1 | 12/2014 | De Assuncao et al. |

FOREIGN PATENT DOCUMENTS

| | | |
|---|---|---|
| JP | 2007310773 | 11/2007 |
| KR | 20120078117 | 7/2012 |
| WO | WO 2008/112038 | 9/2008 |

OTHER PUBLICATIONS

Jinn-Shing Cheng, et al., "An E-Book Hub Service Based on a Cloud Platform," International Review of Research in Open & Distance Learning, vol. 13, Issue 5, p. 39, 2012.
International Search Report Dated Feb. 26, 2015.
Written Opinion Dated Feb. 26, 2015.
Examination Report Dated Mar. 15, 2016.

* cited by examiner

RESOURCE PROVISIONING FOR ELECTRONIC BOOKS

BACKGROUND

1. Technical Field

The present disclosure relates to electronic books and, more specifically, to systems and methods for proactive resource provisioning for electronic books with dynamic content.

2. Discussion of Related Art

Electronic books, or e-books, as they have come to be known, are revolutionizing the book publishing industry. A large variety of titles may be made available to a reader for purchase at any time and from anywhere. Once purchased, e-books may be electronically delivered nearly instantaneously. The e-books may thereafter be read from a wide variety of devices such as personal computers, portable computers, tablet computers, smartphones, and dedicated e-book reading devices, most notably, the Amazon Kindle marketed by AMAZON.COM, the Nook marketed by BARNS & NOBLE, and the Libre marketed by SONY CORPORATION.

While any primarily text-based file may be considered an e-book, popular e-book file formats may provide for the correct display of pictures and other multi-media content. Another important characteristic of e-books is that they are reflowable, which means they may be intelligently displayed on devices having a wide variety of different display sizes. Popular e-book file types include ePub, AZW, Kindle Format 8, and Apple iBook.

Like print books, e-books generally contain static content. In this respect, once published, the content of e-books does not change. The reader may therefore read e-books even without an active connection to the Internet, although various advanced features such as bookmark and page syncing may require such a connection.

BRIEF SUMMARY

A method for provisioning IT resources includes receiving a signal from an e-book reading device indicating that a user of the e-book reading device is approaching a practical procedure section within an e-book being read by the user on the e-book reading device. The practical procedure section includes an exercise to be performed by the user pertaining to the subject matter of the e-book. What IT resources are needed for the user to perform the exercise are determined. The needed IT resources are provisioned such that the IT resources that the needed IT resources are available when the user is ready to perform the exercise.

The signal received from the e-book reading device indicating that the user is approaching the practical procedure section may be generated when an anchor embedded in the e-book text is rendered on a screen of the e-book reading device.

The signal received from the e-book reading device indicating that the user is approaching the practical procedure section may be generated by tracking eye movements of the user of the e-book reading device and determining when the user of the e-book reading device is reading a predetermined portion of the e-book.

The signal received from the e-book reading device indicating that the user is approaching the practical procedure section may be generated when the e-book is purchased, downloaded, or accessed by the e-book reading device.

The e-book reading device may be a dedicated e-book reading device, a tablet computer, a desktop computer, a laptop computer, or a smartphone.

The exercise to be performed by the user may include a problem to solve, an experiment to conduct, a procedure to follow, a mathematical challenge, a question to answer, and/or computer-executable code to write.

The determining of what IT resources are needed for the user to perform the exercise may be performed in accordance with instructions embedded into the e-book.

Provisioning the needed IT resources may include providing one or more cloud-based services for performing the exercise.

Provisioning the needed IT resources may include provisioning one or more virtual machines for providing cloud-based support for performing the exercise.

Provisioning the needed IT resources may include provisioning one or more remote computer servers for providing remote support for performing the exercise.

A system for provisioning IT resources includes an e-book reading device receiving an e-book from an online content store. The e-book is embedded with instructions for determining when IT resources are to be provisioned for permitting a user of the e-book reading device to perform an exercise using the provisioned IT resources. The e-book reading device uses the embedded instructions, during a displaying of the e-book, for invoking the provisioning of the IT resources in accordance with the embedded instructions. A provisioning server receives a message from the e-book reading device indicating that the IT resources are to be provisioned and for provisioning the IT resources in accordance with the received message. A shared IT infrastructure is accessible to the reader of the e-book. The IT resources are provisioned therein.

The e-book reading device may be a dedicated e-book reading device, a tablet computer, a desktop computer, a laptop computer, and/or a smartphone.

The exercise may be performed using the provisioned IT resources pertains to subject matter of the e-book.

The e-book reading device may include a display panel and the instructions for determining when IT resources are to be provisioned embedded within the e-book may provide that provisioning of the IT resources are to be invoked after text surrounding an anchor point included within the e-book is rendered on the display panel.

The online content store may receive the instructions for determining when IT resources are to be provisioned and may embed the instructions into the c-book.

The IT resources may include one or more servers for providing one or more cloud-based services.

The IT resources may include one or more servers hosting one or more virtual machines for providing one or more cloud-based services.

A method for provisioning IT resources includes receiving a signal from a wearable computer indicating that a reader of a printed book is approaching a practical procedure section within the printed book. The practical procedure section includes an exercise to be performed by the reader pertaining to the subject matter of the printed book. What IT resources are needed for the reader to perform the exercise is determined. The needed IT resources are provisioned such that the IT resources that the needed IT resources are available when the reader is ready to perform the exercise.

Generating the signal in the wearable computer may include acquiring an image of a page that the printed book is open to using a camera module within the wearable computer, performing optical character recognition on the acquired image to determine a present location of the reader within the printed book, and generating the signal when the present location of the reader within the printed book equals or exceeds a predetermined location.

Determining a present location of the reader within the printed book may include recognizing a page number using the optical character recognition.

Determining a present location of the reader within the printed book may include comparing text data of the printed book, acquired during the optical character recognition, with text of an e-book version of the printed book.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
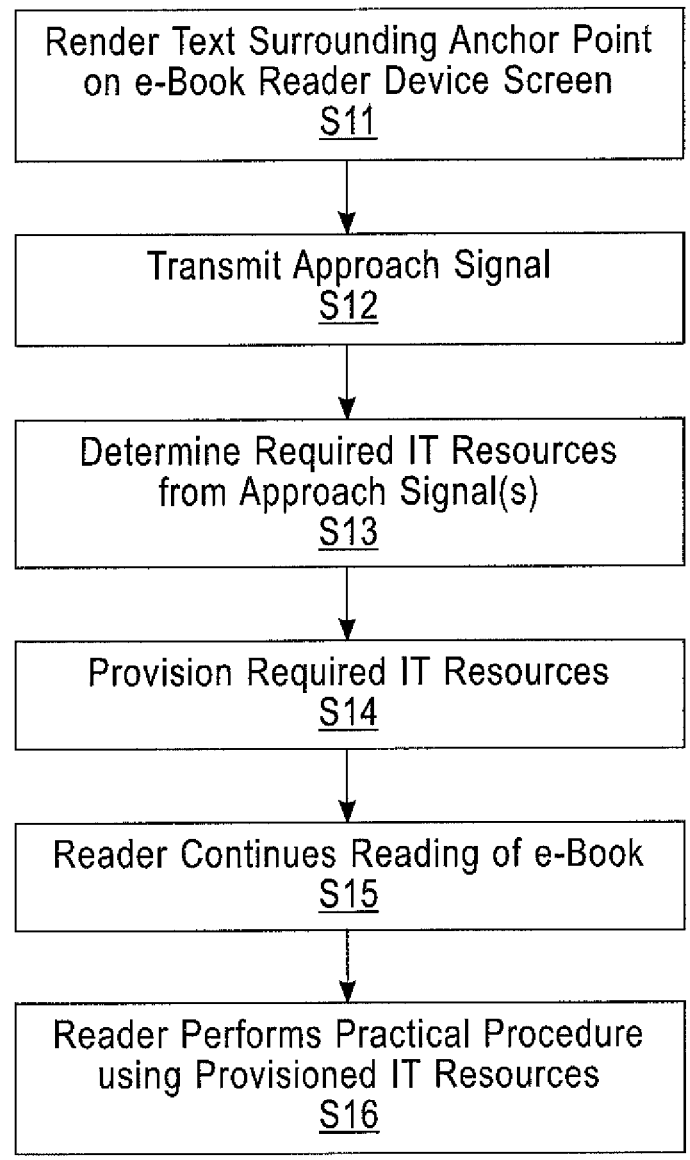
FIG. 1 is a flow chart illustrating an approach for provisioning IT resources in connection with a reading of an e-book in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

While e-books have traditionally included only static content, exemplary embodiments of the present invention provide methods and systems integrating dynamic content into e-books. Dynamic content is content that is free to change either as a result of user-provided input or data received from an external source, for example, over the Internet. In particular, exemplary embodiments of the present invention include within an e-book one or more problems to solve or procedures to follow in order to enhance the educational value of the e-book. For example, where the e-book is an educational textbook whose text describes principals of an academic subject, one or more problems to solve, experiments to conduct, exercises to perform, or procedures to follow (collectively referred to herein as "practical procedures") may be laid out within the e-book. The practical procedures may be highly related to the educational subject matter that the text of the e-book pertains to. In this way, the reader's participation in the practical procedure may enhance the educational value of the e-book.

As discussed above, practical procedures may include problems to solve, experiments to conduct, exercises to perform or procedures to follow. Examples of suitable practical procedures may include asking the reader to solve a mathematical problem, answering questions, creating computer-executable code, or performing a complex procedure. Performing these practical procedures may involve the use of various information technology (IT) infrastructure that may be local to the device displaying the e-book or remotely accessible over a computer network. Here, IT infrastructure may include various computerized processing devices such as computers and various software components such as operating systems, hypervisors, and applications.

In one particular example, an e-book related to teaching a reader thereof to program mobile applications may describe various approaches for designing such an application and then may provide the reader with an opportunity to design a small application for execution on a mobile device. In this case, various IT infrastructure may be used, for example, a text editor may be used to write the code, a compiler may be used to transform the code into an executable form, and a transfer application may be used to load the executable code onto a mobile device for testing. In this context, IT infrastructure may be understood to be electronic hardware and/or software tools and/or assets. Note that setting up this IT infrastructure may take a certain amount of time, especially where the IT infrastructure is not local to the e-book reader, but rather is managed remotely and accessed over the Internet.

For example, the IT infrastructure utilized by the reader to perform the practical procedure described in the e-book may be offered as a cloud-based service by an entity affiliated with the publisher of the e-book.

According to exemplary embodiments of the present invention, the e-book itself may include instructions for setting up or otherwise readying the IT infrastructure utilized by the user in performing the practical procedure. The e-book may additionally include executable instructions for the e-book reader, distinct from the text of the e-book, that the e-book reader uses to determine when the reader is approaching a particular practical procedure described within the e-book and for provisioning the IT infrastructure so that it may be ready for the reader to perform the practical procedure at around the same time the reader is ready to do so. In this way, the reader may be spared from having to manually provision the required IT infrastructure and from waiting idly for the IT infrastructure to be ready.

The IT infrastructure used by the reader during the execution of the practical procedure may be provided by a party involved with publishing the e-book, such as a book publisher. As multiple copies of the e-book may be in circulation, the amount of IT infrastructure used by various readers may be difficult to gauge. This in turn may lead to the publisher securing more IT infrastructure resources than would be required and/or not providing a stuffiest level of resources. Accordingly, exemplary embodiments of the present invention may relay signals to the publisher, or other IT infrastructure provider, indicating when the IT infrastructure is to be needed ("request signals"). These signals may then be aggregated to determine a desired level of IT infrastructure.

Exemplary embodiments of the present invention may determine when the reader is approaching a particular practical procedure described within the e-book by utilizing one or more anchor points embedded within the e-book text. When the text surrounding an anchor point is rendered on screen, an event may be generated and this event may include sending a message to the IT infrastructure provider. The reader's reading speed may be estimated, either using general information or information gleamed from the particular reader reading the particular e-book. While many anchors may exist within the e-book text, the reader's speed may be used to determine which anchor point is used to send the "request" signal discussed above. Alternatively, a particular anchor point may be predetermined without regard to the speed of reading of any particular reader. In either case, when the proper anchor point is rendered, the request signal is sent.

Alternatively, or additionally, page turns, implemented by the reader using the e-book reading device, may be used to determine the speed and progress of the reader through the e-book. Thus the rate of page turns as a matter of time relative to the quantity of content on each page may be used as a gauge of how fast the reader is reading and the number of remaining page turns till the practical procedure may be used along with the rate of page turns to determine an estimated time till the practical procedure is encountered. When this estimated time approaches the predetermined length of time required to provision the IT resources for the practical procedure, provisioning may begin.

The IT infrastructure provider may also utilize other signals for gauging the near-term and long term infrastructure needs, these signals may be generated from various events such as e-book purchases and e-books being read for the first time.

While the e-book may include instructions for relaying request signals, alternatively, the e-book may include calls for dynamic contents, such as additional text, pictures and other e-book multimedia elements that were not originally included within the book but rather are available across the Internet. In such a case, the request signals may be generated by a server hosting the dynamic content when an e-book being read reaches out to the server for the dynamic content. Dynamic content requests may thus be used to gauge the pace and progress of the reader.

Moreover, exemplary embodiments of the present invention may be practiced with media modalities besides e-books. For example, exemplary embodiments of the present invention may be practiced with audiobooks. An audiobook is a sound recording of a text document being read by a person or digital voice synthesizer. Request signals may be generated when an appropriate segment of the audiobook is played, for example, at a predetermined time within the recording. As location within the audiobook is commonly kept track of during the playing of the audiobook, anchors need not be used. Rather, when a predetermined location is reached, the request signal may be generated. As audiobooks may be played at any desired speed, location within the audiobook is speed-invariant. However, playback speed may be taken into account when determining what play location to use to generate the request signal. Play location may be measured either in terms of minutes in or minutes remaining within the entire audio file or a chapter thereof.

Moreover, exemplary embodiments of the present invention may be practiced using conventional print books as well. For example, the reader may utilize a camera such as one mounted into a wearable computer, for example, Google Glass, presently under development by GOOGLE INC. The camera may capture images of a present page being read by the reader, perform optical character recognition (OCR) on the captured images, and cross-reference the OCR data against various e-books to determine a title of the book and present location therein. The anchor points may be taken either by known places within the print book or by associating the print book with its e-book counterpart, where the anchor points are within the e-book.

This approach may be used either independently or in conjunction with an application used to synchronize a reader's position within an e-book with that reader's position within a print version of the same book.

Figure 2:
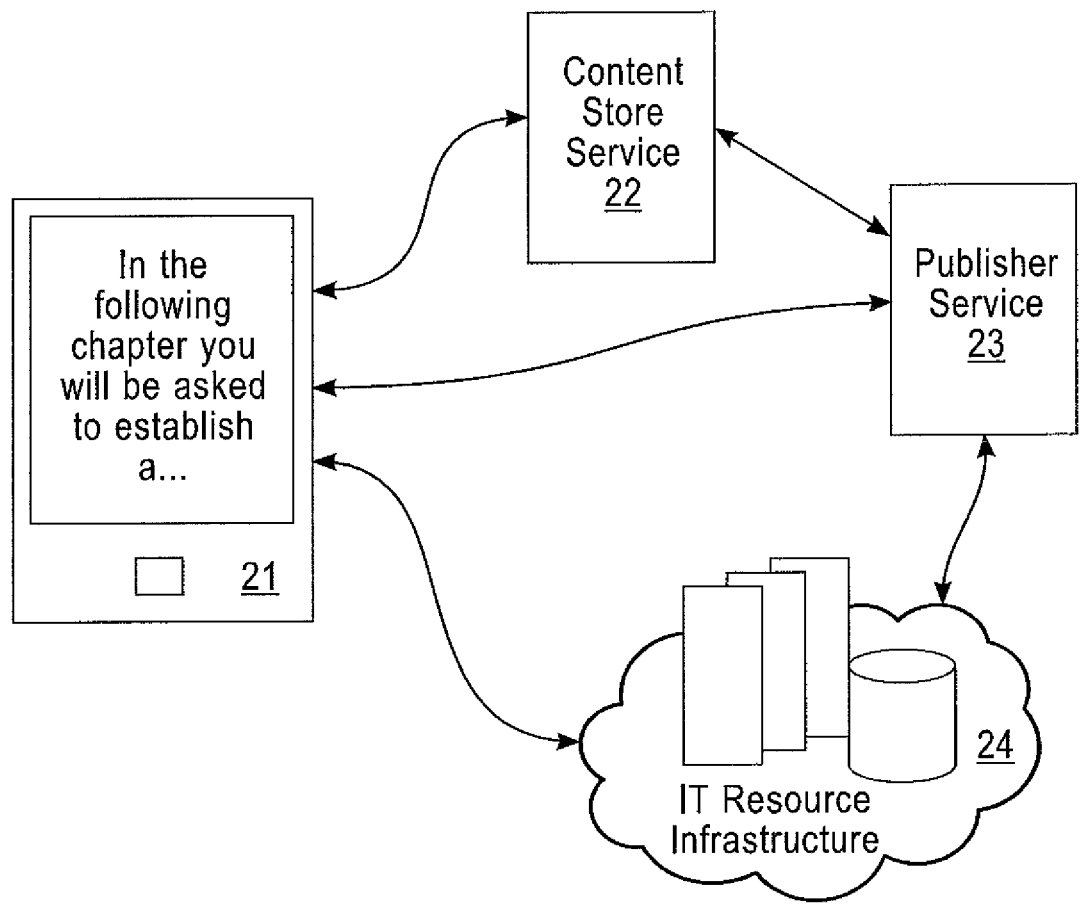
FIG. 2 is a schematic diagram illustrating a system for provisioning IT resources in connection with the reading of the e-book in accordance with exemplary embodiments of the present invention.

Exemplary embodiments of the present invention are described below in greater detail with reference to the figures. FIG. 1 is a flow chart illustrating an approach for provisioning IT resources in connection with a reading of an e-book in accordance with exemplary embodiments of the present invention. FIG. 2 is a schematic diagram illustrating a system for provisioning IT resources in connection with the reading of the e-book in accordance with exemplary embodiments of the present invention. A reader, having previously acquired an e-book from a content store service 22 and downloaded the e-book to the reader's e-book reading device 21, may engage in the reading of the e-book. As the reader progresses through the e-book, text of the e-book is rendered on the display of the reading device 21. An anchor point, embedded within the e-book, for example, by the content store service 22 or a publisher service 23 that is responsible for, or affiliated with a service that is responsible for, providing the e-book to the content store service 22, may mark a particular position within the text of the e-book. The anchor point itself need not be rendered on the display along with the text. The e-book reader has the ability to know when the text surrounding a particular anchor point has been rendered on screen. Because the e-book is reflowable, the exact page number of the anchor page need not be considered. Multiple anchor points may be embedded in the text and by rendering the text adjacent to or associated with a particular anchor point, the e-book reading device may be able to determine the reader's pace and prowess through the e-book. An anchor point may be positioned within the e-book such that progressing to that anchor point signifies that it is time to begin provisioning. According to one approach, when the text surrounding such an anchor point is rendered (Step S11), an approach signal is transmitted from the reading device 21 (Step S12).

This approach signal may be transmitted either directly to an IT resource infrastructure 24 so that provisioning may begin, to a publisher service 23 which then initiates the provisioning, or to the content store service 22, which may communicate to the publisher service 23 to do the same.

The approach signal signifies that provisioning should begin as the reader is approaching the section of the e-book that introduces the practical procedure. However, a determination may also be made as to exactly what IT resources may be required (Step S13). This determination may be made by the reading device 21, the content store service 22, the publisher service 23 or at the IT resource infrastructure 24 itself. In either case, this determination may be based on the particular needs of the practical procedure that the reader is approaching. These needs may be stored as metadata within the e-book or as related data stored elsewhere.

The approach signal and the determined resources may then be used to provision the required IT resources (S14) so that when the reader approaches the practical procedure section, the required IT resources are already in place and ready to be used. This step may be performed collectively, for example, where multiple copies of the same e-book are being read at the same time. In such a case, multiple approach signals may be received and then sufficient IT resources may be provisioned to satisfy the future demand.

It is to be understood that according to one understanding, an "e-book" is a particular form of data file defined by containing mostly text and optimized for display primarily by a dedicated e-book reading device, although display on other devices may be possible. However, according to another understanding (both understandings being contemplated by the present disclosure), an e-book is more generally understood to be any data document comprised primarily of text data and set up to be read but not written to. According to this second understanding, a webpage may be considered an e-book.

Conventionally, websites may be prone to failure under unexpected demand, as components thereof, that may be seen as practical procedures, draw disproportionately from website resources as compared to the text included within the website. Thus, exemplary embodiments of the present invention may be used to predict the demand on the website and bring up additional hosting resources just as the website readers are ready to engage the practical procedure sections thereof.

The provisioning of the IT resources may take seconds or hours. In either event, the reader may continue to progress through the e-book as the IT resources are being provisioned (Step S15). Therefore, when the reader is ready to perform the practical procedure, the IT resources may be provisioned (Step S16) so the reader need not have to wait. Even if the provisioning is still not complete by the time the reader arrives at the practical procedure section, the amount of time the reader may have to wait may be reduced. In the aggregate case, the IT resources may be less likely to fail under unexpected demand.

Figure 3:
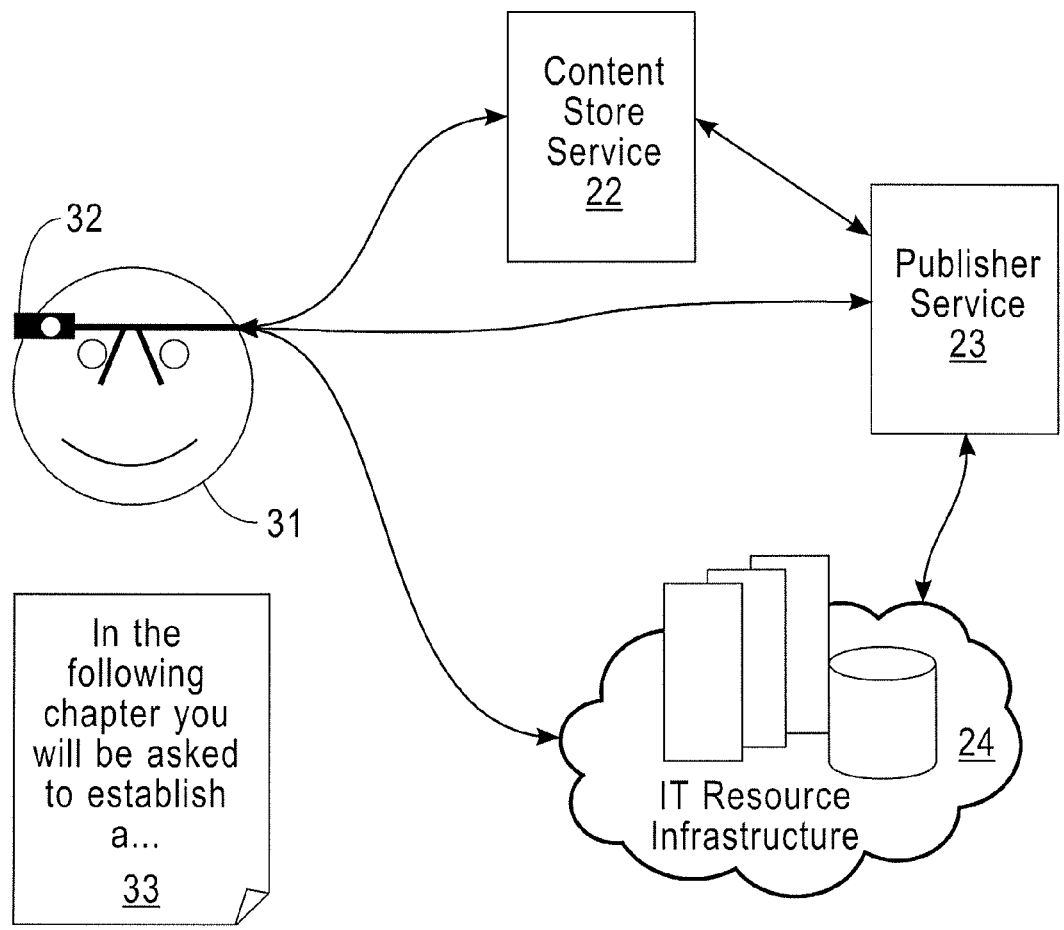
FIG. 3 is a schematic diagram illustrating an approach for provisioning IT resources in connection with a reading of a printed book in accordance with exemplary embodiments of the present invention.

FIG. 3 is a schematic diagram illustrating an approach for provisioning IT resources in connection with a reading of a printed book in accordance with exemplary embodiments of the present invention. Here, the reader 31 may be outfitted with a wearable computer device 32 that includes a camera module. As the reader 31 reads printed material 33, such as a traditional bound book or other printed documents, the wearable computer device 32 may capture an image of the printed material 33. This image may be analyzed, for example, using optical character recognition (OCR) so that the content is understood and the reader's position within the content can be known. This may occur, for example, by determining a page number or matching observed text with an e-book version of the same text. Computation may be performed either by the wearable computer 31 itself or by a remote computing device, for example, a server accessible over the Internet or a smartphone that the wearable computer device 32 maintains a connection to, for example, using Bluetooth protocols.

By analyzing the acquired image of the printed material 33, exemplary embodiments of the present invention may determine the rate and/or progress of the reader through the printed material 33 so that an alert may be generated when the reader approaches a practical procedure. The remainder of this process may be substantially the same as described above and the required IT resources may be available as the reader approaches the relevant section.

Figure 4:
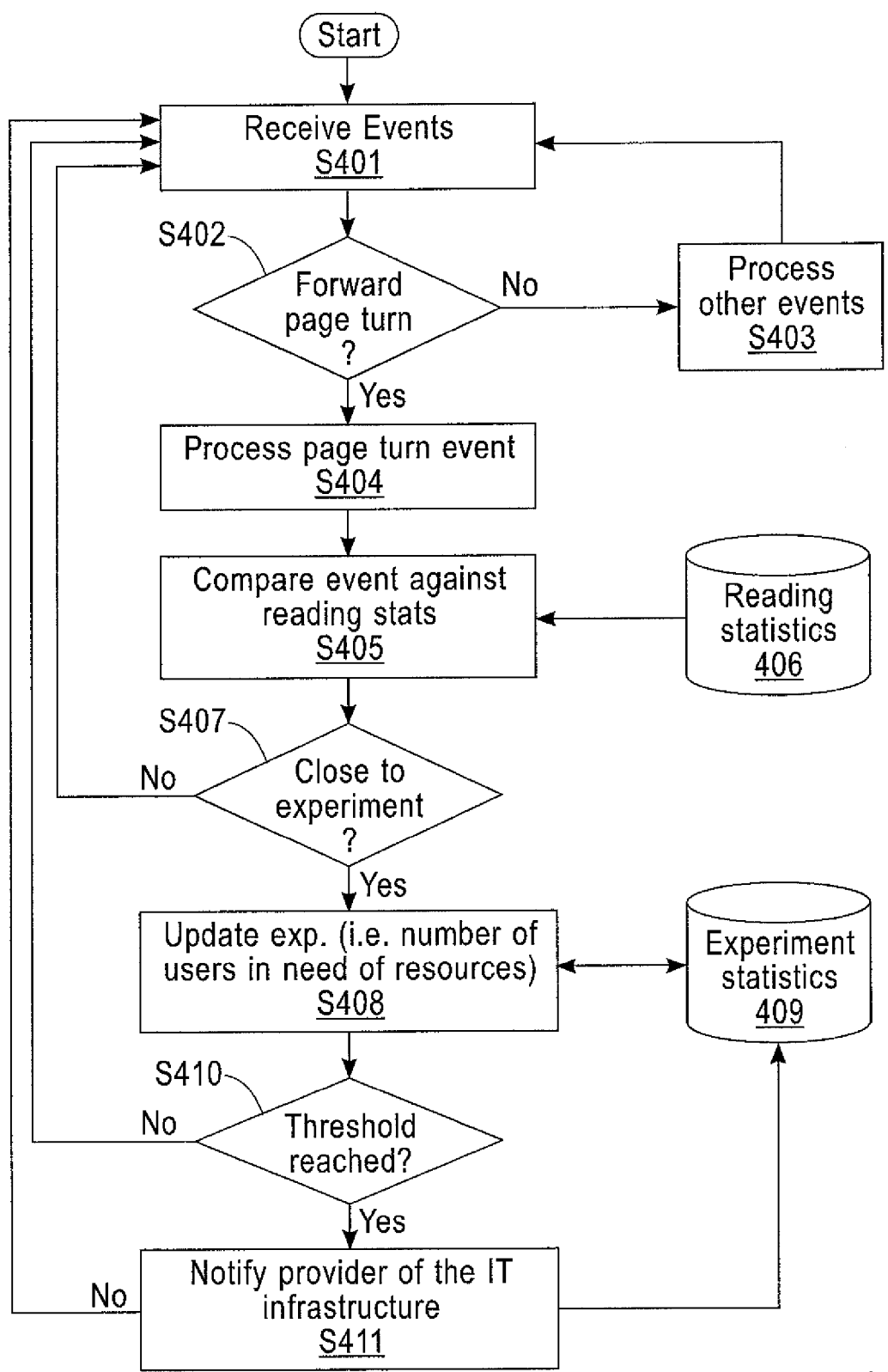
FIG. 4 is a flow chart illustrating a detailed approach for collecting reading information and triggering resource provisioning in accordance with exemplary embodiments of the present invention.

FIG. 4 is a flow chart illustrating a detailed approach for collecting reading information and triggering resource provisioning in accordance with exemplary embodiments of the present invention. The steps described here may be performed by the e-book reading device. Upon the start of the process (START), events may be received (Step S401). This event may be the rendering of text surrounding an anchor point, as described above, but it may also or alternatively be a forward turn signal indicating that the reader has requested that a next page of the e-book be displayed. As there may be other types of events received, it may be determined whether the event received is a forward page turn (Step S402). Where it is not (No, Step S402), the event may be processed in accordance with the type of event it is (Step S403) and then the process may await additional events (Step S401). As the events may be any signal of the e-book reading device, the processing of the other events may include the changing of display contrast and any other e-book reading device function not related to the instant approach.

Where the event is a forward page turn (Yes, S402), the e-book reading device may process the page turn event in the ordinary course (Step S404). This may include, for example, rendering the next page of text on the display. A database of reading statistics (406) may store data pertaining to how fast readers in general tend to read the present section of the present e-book and/or how fast the particular reader tends to read similar sections of text. This reading statistics database (406) data may be compared against the processed page turn events over time (Step S405) to estimate how close in time the reader is to approaching the practical procedure experiment (Step S407). A threshold may be established to determine just how much time is considered to be "close to the experiment." This threshold may be determined in Step S405 based on the event statistics and the reading statistics. The threshold may be set such that the reader, at his or her determined reading speed, will arrive at the experiment in substantially the same or some margin of time greater than amount of time needed to provision IT resources required to perform the experiment.

When it is determined that the experiment is not close (No, Step S407), then the process may wait for additional events (Step S401). When it is determined that the experiment is close (Yes, Step S407), then a tally of IT infrastructure required to perform the experiment may be updated in accordance with the aggregate number of users that are close to performing the given experiment (Step S408). In making this determination, a database of experiment statistics (409) may be consulted. Experiment statistics may be used to establish what quantity and types of IT resources may be required for the given experiment and/or the amount of utilization each person running the experiment is likely to impose upon the IT resources.

When a threshold amount of projected resource utilization is reached (Yes, Step S410), then a provider of the IT resource infrastructure may be notified to begin provisioning (Step S411). When this threshold has not been reached (No, Step S410), for example, because the amount of projected utilization does not exceed the present ability of the available IT resources, the process may return to waiting for additional events (Step S401).

Figure 5:
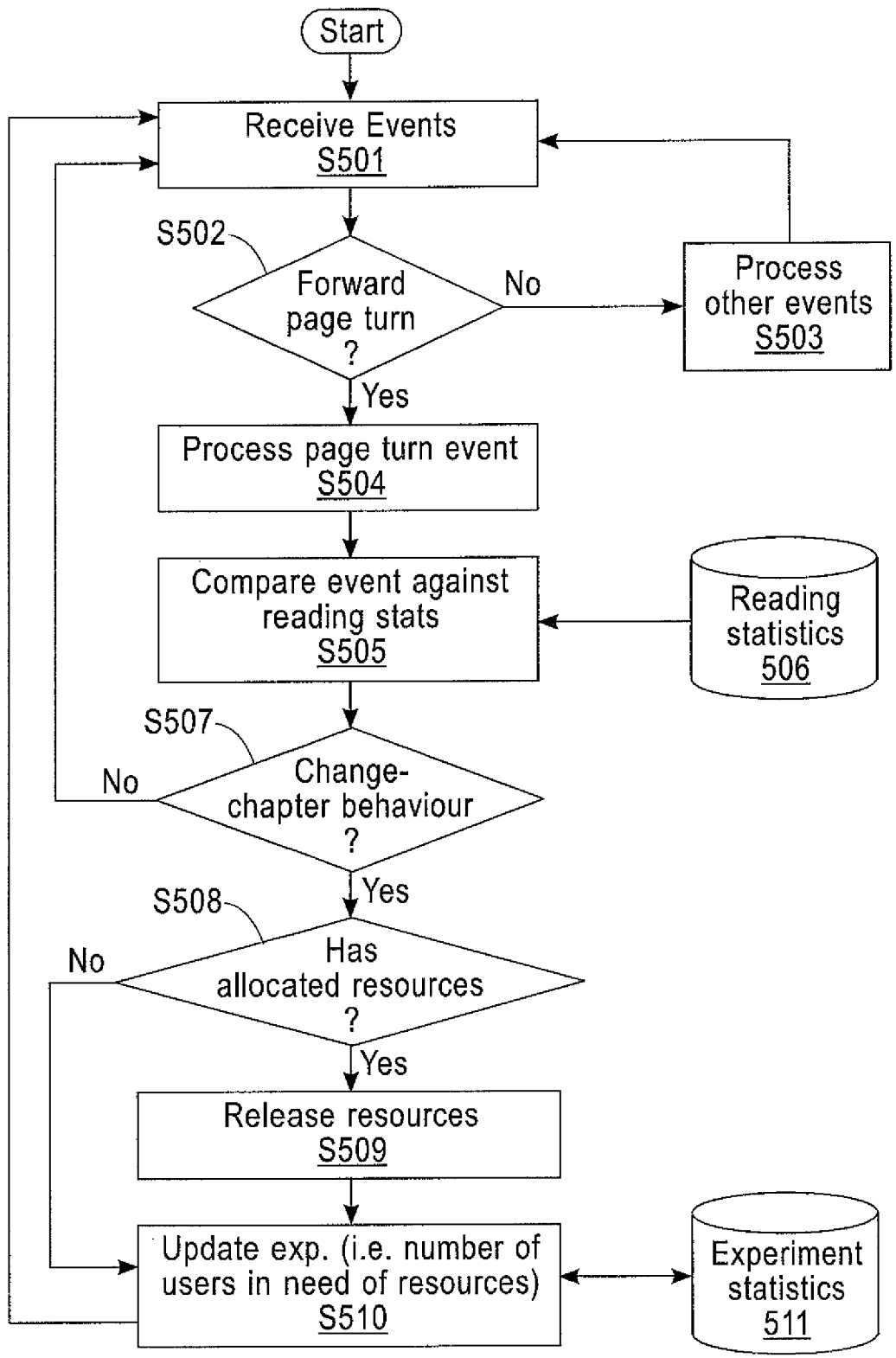
FIG. 5 is a flow chart illustrating a detailed approach for releasing resources previously allocated to carry out user experiments in accordance with exemplary embodiments of the present invention.

Exemplary embodiments of the present invention may also release allocated IT resources when they are predicted to no longer be needed. FIG. 5 is a flow chart illustrating a detailed approach for releasing resources previously allocated to carry out user experiments in accordance with exemplary embodiments of the present invention. Upon the process starting (Start), events may be received (Step S501). Similar to the approach described above, it may be determined whether the event is a forward page turn (Step S502). Where it is not (No, Step S502), the event may be processed in the ordinary course (Step S503) and the method may return to awaiting additional events (Step S501).

Where the event is a forward page turn (Yes, Step S502), the forward page turn may be processed (Step S504) and the event statistics may be compared to reading statistics retrieved from the reading statistics database (506) to determine whether the reader has progressed to a new chapter in the e-book and thereby left the chapter containing the exercise (Step S507). The reading statistics database (506) may include information such as how many page turns are required to bring the reader to a new chapter and/or may provide a way of determining whether the reader is actually reading the next chapter or simply skimming ahead with the intention to return to the chapter including the exercise.

Where it is determined that the user has not truly begun to read the next chapter (No, Step S507), the method may return to receiving events (Step S501). Where it is determined that the reader has changed chapters (Yes, Step S507), it may then be determined whether IT resources have already been allocated for that reader to perform the exercise associated with that chapter (Step S508). If it had (Yes, S508), then the allocated resources may be released (Step S509). If it had not (No, Step S508), or after the resources have been released (Step S509), then the estimated number of users requiring the IT resources may be updated (Step S510), for example, based on experiment statistics (511). In this way, the moving of a reader to the next chapter may be used to release resources and/or to leave resources the same in the event that another reader is simultaneously determined to be near the same exercises.

Figure 6:
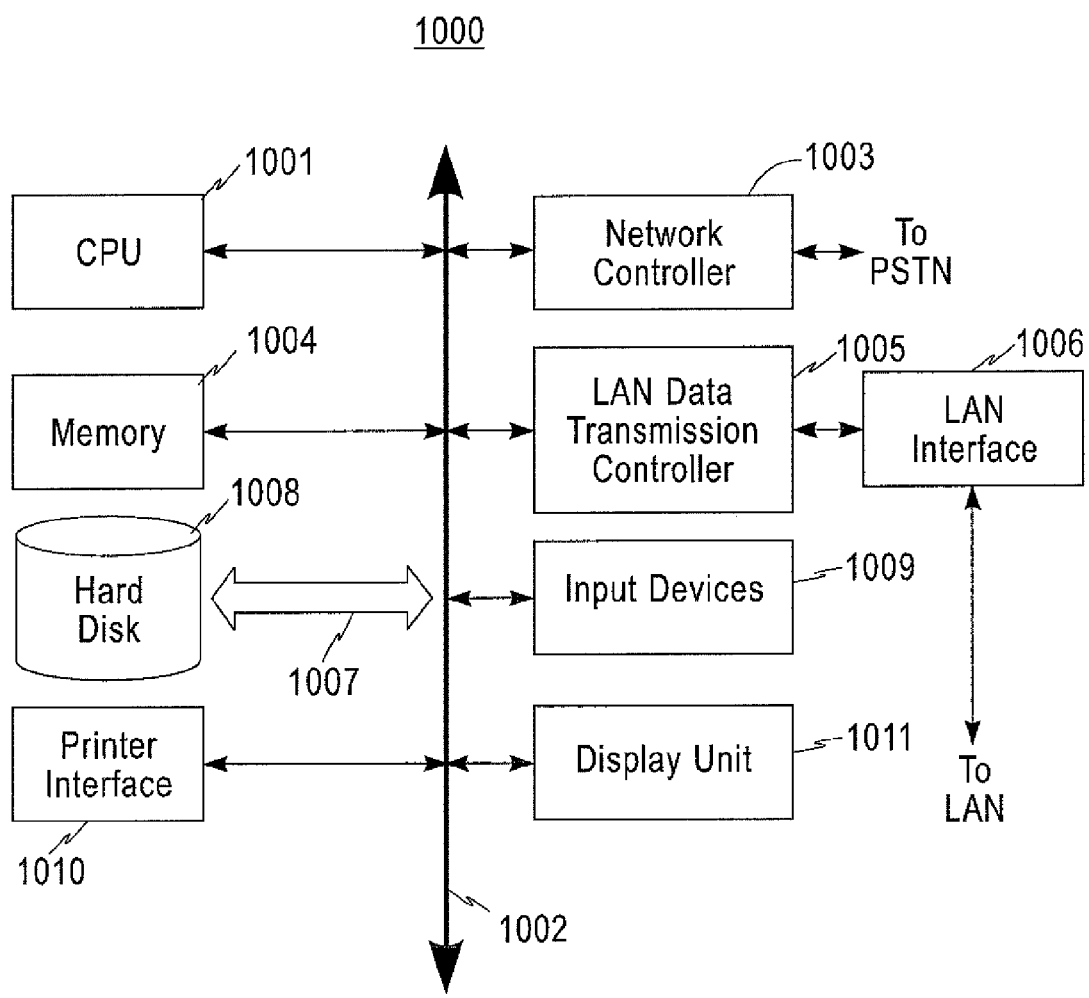
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for provisioning IT resources, comprising:
receiving a first plurality of page-turn signals from a first e-book reading device indicating times that a first user of the first e-book reading device is turning pages of an e-book being read by the first user on the first e-book reading device, the e-book also being read by a second user on a second e-book reading device;
determining a speed of progress of the first user through the e-book based on a timing of the received first plurality of page-turn signals;
receiving a second plurality of page-turn signals from the second e-book reading device indicating times that the second user of the second e-book reading device is turning pages of the e-book on the second e-book reading device;
determining a speed of progress of the second user through the e-book based on a timing of the received second plurality of page-turn signals;
gauging how fast the first user is reading the e-book based on the determined speed of progress of the first user through a plurality of pages of the e-book and based on quantity of content in each of the plurality of pages of the e-book;
gauging how fast the second user is reading the e-book based on the determined speed of progress of the second user through the plurality of pages of the e-book and based on quantity of content in each of the plurality of pages of the e-book;
estimating a time at which the first user will encounter a practical procedure section within the e-book based on the gauged speed with which the first user is reading the e-book and a distance within the e-book between a present reading location of the first user and a location at which the practical procedure is introduced within the e-book, the practical procedure section including an exercise to be performed pertaining to the subject matter of the e-book;
estimating a time at which the second user will encounter the practical procedure section within the e-book based on the gauged speed with which the second user is reading the e-book and a distance within the e-book between a present reading location of the second user and the location at which the practical procedure is introduced within the e-book;
estimating an aggregate demand for IT resources that are needed for both the first user and the second user to perform the exercise based on the estimated time of the first user and the estimated time of the second user; and
provisioning the estimated level of IT resources from a remote server, by at least acquiring a number of IT resources from the remote server based on the estimated aggregate demand, such that the provisioned IT resources are available to the first and second users at the estimated time.

2. The method of claim 1, wherein each of the first and second e-book reading devices is a dedicated e-book reading device, a tablet computer, a desktop computer, a laptop computer, or a smartphone.

3. The method of claim 1, wherein the exercise to be performed by the first user and the second user includes a problem to solve, an experiment to conduct, a procedure to follow, a mathematical challenge, a question to answer, or computer-executable code to write.

4. The method of claim 1, wherein the estimating of the aggregate demand for the IT resources is performed in accordance with instructions embedded into the e-book.

5. The method of claim 1, wherein provisioning the estimated level of IT resources includes providing one or more cloud-based services for performing the exercise.

* * * * *